Patented Mar. 27, 1934

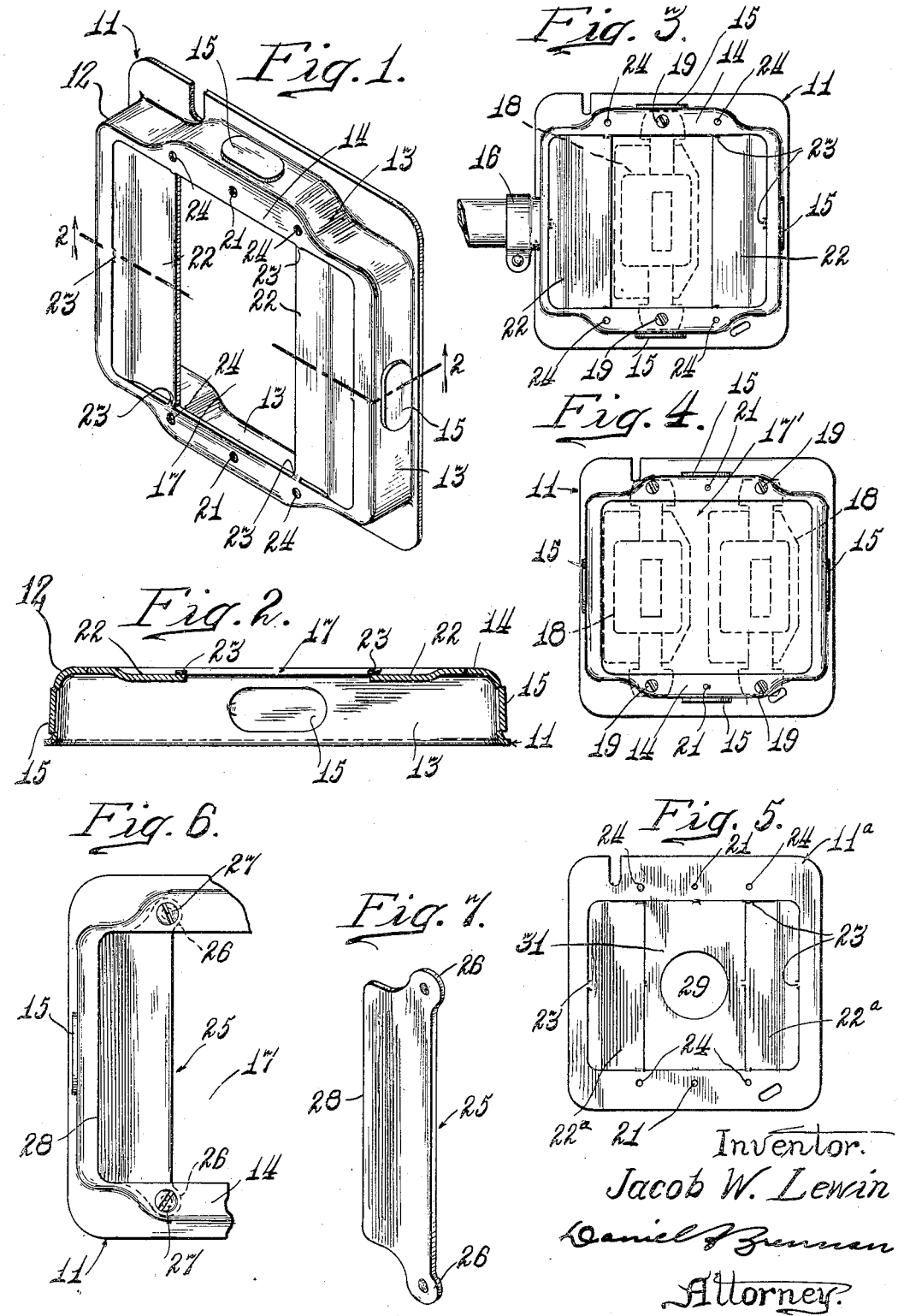

1,952,719

UNITED STATES PATENT OFFICE 1,952,719

OUTLET BOX COVER

Jacob W. Lewin, Oak Park, Ill.

Application May 4, 1931, Serial No. 534,809

8 Claims. (Cl. 247—15)

The invention relates to improvements in cover plates and particularly to an improved switch box cover plate having removable means therein adapting said plate for reception of one or more electric switches.

An object of the invention is to provide an improved cover plate of the character referred to with knock-outs to receive, in communication with the switch box, oval duct.

Another object is to provide a switch box cover plate of the character referred to with means to facilitate ready enlargement of the switch opening therein.

Another object is to provide an improved cover plate, for a switch box, with means for mounting one or more switches in central alignment therewith.

Another object is to provide an improved switch box cover plate having mounting means for one or more switches, with means to facilitate arrangement of said switches in any one of a plurality of positions.

Another object of the invention is to provide improved means for reducing the size of the switch opening in a cover plate which may be readily mounted and secured in position.

The foregoing and such other objects of the invention as will appear hereinafter as the description proceeds, will be more readily understood from a perusal of the following specification, reference being had to the accompanying drawing, in which:

Fig. 1 is a perspective view of the improved cover plate.

Fig. 2 is a sectional view, taken on line 2—2 of Fig. 1.

Fig. 3 is an elevational view of the improved cover plate, showing, in dotted lines, a switch mounted therein.

Fig. 4 is a view similar to Fig. 3, showing a plurality of switches mounted in the switch box cover plate.

Fig. 5 is an elevational view of a flat cover plate for a receptacle.

Fig. 6 is a fragmentary front elevational view of the improved cover plate with the knock-outs removed, showing a plate secured over the enlarged opening to reduce the size of said opening.

Fig. 7 is a perspective view of the plate shown in Fig. 6.

Known types of cover plates for switch boxes in electrical wiring systems are provided with an opening of fixed size for receiving and mounting the switch or switches therein. In such plates no means is provided to adapt them satisfactorily to receive a number of switches other than that for which they are designed. For example, a plate having a single switch opening cannot, under any circumstances, be used in a circuit requiring installation of two or more switches in a single outlet box. Then again, to use a cover plate having an opening sufficiently large to receive two or more switches for only one switch necessitates the positioning of that switch to one side of said opening and blocking out, with a blank plate, the other portion or half of the opening. It can be readily understood that such blocking out and non-central positioning of the switch is unsatisfactory because of the unbalanced outward appearance when a single switch lever or button extends through one of a plurality of openings in the usual finishing face plate.

The improved cover plate overcomes the foregoing objections by having means formed therein for reception of a single switch centrally arranged, or two or more switches equally spaced on both sides of the center. The flexibility of adaptation of the improved cover plate can be readily appreciated when a large number of cover plates are required for extensive wiring jobs. The necessity of carrying, in stock, various types of plates is eliminated because one plate for each size of outlet boxes will serve for all similar switch outlets.

As shown in the accompanying drawing in Figs. 1 to 4 inclusive, the improved sheet metal cover plate 11 preferably has a central raised portion 12 having side walls 13 and face 14. The side walls 13 may have a plurality of knock-outs 15, preferably oval shaped, to receive oval duct couplings 16. The use of oval duct in association with the improved cover plate is very desirable. because such use reduces the depth of the raised portion 12. It is to be understood, however, that by increasing the depth of the raised portion 12, round knock-outs for the usual conduit piping may be provided.

As shown in Figs. 1, 2, and 3, inclusive the face 14 of the rased portion 12 has a centrally located substantially longitudinal opening 17 for receiving a switch 18 of known construction. The switch 18 is secured to the cover plate by screws 19, which threadingly engage in tapped openings 21, one adjacent each end of the opening 17.

Suitable depressed rectangular knock-out portions 22 are provided on the face 14 of the raised portion 12, one on each side of the central opening 17, which preferably are severed from the face except, for example, at the points of anchorage 23. The depressed portions 22 provide recesses for the reception of plaster or other suitable fill in material. By removing the knock-out portions 22 the size of the opening 17 readily may be increased.

As shown in Fig. 4, the knock-out portions 22 have been removed, and a pair of switches 18 are shown mounted within the enlarged opening 17'. The pair of switches 18 are secured, as before, by screws 19, said screws however threadingly engaging tapped openings 24 equally spaced at either side of the centrally located tapped openings 21.

Atlhough the cover plate illustrated is of the most commonly used type, cover plates for switch boxes adapted to contain a larger number of switches may be provided with a corresponding number of knock-out portions, whereby the number of switch openings may be increased readily to receive any number of said switches. For example, assuming a cover plate of a size to receive ten switches, should only six switches be mounted thereon, six of the knock-outs are removed, the remaining four closing the space not occupied by the switches.

In re-wiring jobs, or the like, it often is necessary to place a single switch in an outlet box and cover plate formerly containing two or more switches. In this event, it is the unused portion of the opening in the plate that must be closed to prevent entrance into the switch box of dirt, water etc. To this end, suitable closure plates 25, such as illustrated in Figs. 6 and 7, are provided, one of which is secured on each side of the opening 17'. The plate 25 has suitable tapped ears 26 extending in the rear of the face 14 of the cover plate to receive screws 27 to secure the plate in place. The plate 25 preferably is curved laterally slightly to bring its free edge 28 substantially flush with the face 14 of the cover plate.

The improved construction readily may be applied to a flat cover plate 11a, for a base receptacle, of the type shown in Fig. 5. This plate preferably is provided with a centrally located opening 29 to receive the base plug receptacle. A plurality of knock-outs 22a and 31 are formed in the plate to allow removal of knock-out 31 to adapt the plate to receive a switch as in the type heretofore described, or allow removal of the knock-outs 22a and 31 to receive a plurality of switches.

Although exemplary forms of the improved cover plate are illustrated in the accompanying drawing and described in detail in the foregoing specification, it is to be understood that the construction may vary to suit various types of installation and to accommodate various number of switches without departing from the spirit of the invention or the scope of the appended claims.

I claim:

1. In a cover for a switch box, a plate, a raised central portion formed thereon and having a centrally arranged elongated opening therein, a plurality of knock-outs in the side walls of said raised portion, and knock-outs one on each side of said elongated opening removable to increase the area of said opening.

2. In a cover for an outlet box, a plate, a raised central portion thereon having an elongated opening therein to receive a switch, said central portion having means adjacent each end of said opening for securing said switch in place, knock-outs in said raised portion forming the side boundaries of said opening and removable to enlarge said opening for receiving two switches, and securing means at the ends of the enlarged opening for said switches.

3. A switch box cover having a centrally aligned opening to receive a switch, apertured switch mountings at the ends of said opening, and knock-out portions one on each side of said centrally aligned opening removable to increase the width of said opening for receiving two or more switches.

4. In a cover plate, for a switch box having a raised portion provided with knock-outs in its side walls, a plurality of knock-out portions in the front face of said raised portion, and a plurality of spaced threaded screw receptacles in said face providing attaching means for one or more switches arranged in said outlet box.

5. A cover plate for an outlet box, having, in combination, a raised central portion having an opening in its face adapted to receive a switch, and knock-out portions in said face one on each side of said opening removable to admit a plurality of switches.

6. A cover plate having an opening therein to receive a switch, means in said cover plate to enlarge said opening for receiving a plurality of switches, and said plate having means to secure said switch or switches in place, and insert members attachable to said plate to reduce the size of the enlarged opening.

7. A switch box cover and mounting plate having an opening for a switch, a knock-out on each side of said opening removable to enlarge the opening to admit a plurality of switches, said cover plate having means to secure said switch or switches therein, and plates adapted to be held by said securing means over the enlarged opening in place of said knock-out portions for reverting said cover plate to a single switch mounting.

8. A switch box cover having an opening to receive a switch, switch mounting means forming a part of the cover, and knock-out portions on opposite sides of said opening removable to increase the size of said opening for receiving a plurality of switches, said knock-out portions depressed to form material receiving recesses when the knock-out portions are left in place.

JACOB W. LEWIN.